(12) United States Patent  (10) Patent No.: US 6,518,982 B2
Dow et al.  (45) Date of Patent: Feb. 11, 2003

(54) SYSTEM AND METHOD OF SELECTING PAGES THAT AN APPLIANCE IS SENDING

(75) Inventors: James C. Dow, Fort Collins, CO (US); Dan L. Dalton, Greeley, CO (US); Michael L. Rudd, Fort Collins, CO (US); Karin C. Ruffatto, Fort Collins, CO (US); Kevin N. Smith, Fort Collins, CO (US); Daniel Formosa, Montvale, NJ (US); Sandra Nieves, New York, NY (US); Paul Hamburger, New York, NY (US); Michael J. DeVries, Loveland, CO (US); Nancy Shepard, Arvada, CO (US)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 09/894,555

(22) Filed: Jun. 28, 2001

(65) Prior Publication Data

US 2001/0033300 A1 Oct. 25, 2001

Related U.S. Application Data

(63) Continuation of application No. 09/130,869, filed on Aug. 7, 1998, now Pat. No. 6,396,518.

(51) Int. Cl.[7] ................................................. G09G 5/00
(52) U.S. Cl. ...................... 345/772; 345/779; 345/809; 345/837; 345/864
(58) Field of Search ................................. 345/764, 769, 345/771, 772, 774, 779, 809, 837, 839, 864

(56) References Cited

U.S. PATENT DOCUMENTS

| | | | |
|---|---|---|---|
| 5,278,673 A | | 1/1994 | Scapa et al. ................ 358/473 |
| 5,438,662 A | * | 8/1995 | Randall ....................... 345/776 |
| 5,496,992 A | | 3/1996 | Madan et al. ................ 235/462 |
| 5,555,105 A | | 9/1996 | Shahir et al. ................ 358/473 |
| 5,595,445 A | | 1/1997 | Bobry .......................... 400/88 |
| 5,596,694 A | | 1/1997 | Capps .......................... 345/352 |
| 5,596,697 A | * | 1/1997 | Foster et al. ................ 345/810 |
| 5,604,854 A | * | 2/1997 | Glassey ....................... 345/419 |
| 5,615,384 A | | 3/1997 | Allard et al. .................. 712/1 |
| 5,657,461 A | * | 8/1997 | Harkins et al. ............. 345/733 |
| 5,838,458 A | * | 11/1998 | Tsai ............................ 358/402 |
| 5,841,855 A | | 11/1998 | Davidson et al. ........... 379/387 |
| 5,854,694 A | | 12/1998 | Payne et al. ................ 358/473 |
| 5,877,746 A | | 3/1999 | Parks et al. ................. 345/156 |
| 5,956,466 A | | 9/1999 | Horiuchi et al. ............ 395/109 |
| 5,987,535 A | | 11/1999 | Knodt et al. ................ 710/15 |
| 6,078,407 A | | 6/2000 | Ma .............................. 358/474 |
| 6,100,878 A | | 8/2000 | Hirayama .................... 345/179 |
| 6,104,396 A | | 8/2000 | Hanaoka et al. ............ 345/348 |
| 6,134,017 A | * | 10/2000 | Schlank et al. ............. 358/1.15 |
| 6,144,997 A | * | 11/2000 | Lamming et al. ........... 707/500 |
| 6,178,338 B1 | | 1/2001 | Yamagishi et al. ......... 455/566 |
| 6,262,732 B1 | * | 7/2001 | Coleman et al. ............ 345/835 |

FOREIGN PATENT DOCUMENTS

| | | |
|---|---|---|
| EP | 0 607 728 A2 | 12/1993 |
| EP | 0 646 857 A1 | 9/1994 |
| EP | 0 679 014 A2 | 4/1995 |
| EP | 0 785 664 A2 | 7/1997 |
| EP | 0 902 582 A2 | 9/1998 |

OTHER PUBLICATIONS

Ron Person et al, Using Microsoft Window 95, Second edition, 1997, pp. 969–970.*

* cited by examiner

*Primary Examiner*—Ba Huynh

(57) ABSTRACT

An appliance provides for the selection of data to be transmitted to an external device by selecting metaphoric page icons, each icon corresponding to a page of captured information. Metaphoric page icons may be selected by selecting the icons individually, by selecting a predefined group of icons, by selecting tagged icons, or by selecting all icons. A default selection includes selecting the current metaphoric page icon displayed on the display.

21 Claims, 10 Drawing Sheets

SYSTEM AND METHOD OF SELECTING PAGES THAT AN APPLIANCE IS SENDING

CLAIM OF PRIORITY

This application is a continuation of copending U.S. utility application entitled, "APPLIANCE AND METHOD OF USING SAME HAVING A SEND CAPABILITY FOR STORED DATA" having Ser. No. 09/130,869, filed Aug. 7, 1998, now U.S. Pat. No. 6,396,518, which is incorporated herein by reference in its entirety.

CROSS REFERENCE TO RELATED APPLICATIONS

This application is related to U.S. application entitled "APPLIANCE AND METHOD OF USING SAME HAVING A USER HELP CAPABILITY," having Ser. No. 09/130,080, filed Aug. 7, 1998, U.S. application entitled "APPLIANCE AND METHOD OF USING SAME FOR CAPTURING IMAGES," having Ser. No. 09/130,573, filed Aug. 7, 1998, U.S. application entitled "APPLIANCE AND METHOD OF USING SAME HAVING A DELETE CAPABILITY FOR SAVED DATA," having Ser. No. 09/130,082, filed Aug. 7, 1998, U.S. application entitled "APPLIANCE AND METHOD OF USING SAME HAVING A CAPABILITY TO GRAPHICALLY ASSOCIATE AND DISASSOCIATE DATA WITH AND FROM ONE ANOTHER," having Ser. No. 09/130,789, filed Aug. 7, 1998, U.S. application entitled "APPLIANCE AND METHOD FOR COMMUNICATING AND VIEWING MULTIPLE CAPTURED IMAGES," having Ser. No. 09/130,081, filed Aug. 7, 1998, U.S. application entitled "APPLIANCE AND METHOD FOR NAVIGATING AMONG MULTIPLE CAPTURED IMAGES AND FUNCTIONAL MENUS," having Ser. No. 09/130,584, filed Aug. 7, 1998, U.S. application entitled "APPLIANCE AND METHOD FOR CAPTURING IMAGES HAVING A USER ERROR INTERFACE," having Ser. No. 09/130,572, filed Aug. 7, 1998, U.S. application entitled "APPLIANCE AND METHOD FOR VIEWING CAPTURED IMAGES," having Ser. No. 09/131,258, filed Aug. 7, 1998, and U.S. application entitled "APPLIANCE AND METHOD FOR MENU NAVIGATION," having Ser. No. 09/130,868, filed Aug. 7, 1998, which are incorporated herein by reference.

BACKGROUND OF THE INVENTION

The present invention relates generally to the field of graphical user interfaces and, more particularly, to a portable hand-held appliance for capturing images through digital scanning and has a graphical user interface for displaying the captured images for user manipulation and processing, and communicating those images to another device or appliance.

Intangible information is a vital business asset that can be exploited for competitive advantage if managed properly. In the past fifteen years, improvements in information processing have been achieved primarily from the widespread use of microcomputers in the workplace and their application in local and wide area networks. Through such applications as electronic mail (email) and networked access to document storage servers, the electronic communications market has exploded. Nevertheless, business is still far from reaching a "paperless" workplace. For example, according to a 1993 report by BIS Strategic Decisions (hereinafter BIS), an information technology consulting firm, more than 90 billion documents were created in 1992 and more than 1 trillion copies of those documents were made. Moreover, BIS estimated that printing and copying expenses average between 6% and 13% of a typical company's revenue. These statistics illustrate the economic savings available for those businesses that are able to merge paper and technology in a unified information processing strategy.

One tool that has proven useful for translating between paper and electronic information is the digital scanner. Scanner-enabled document distribution endows paper-based documents with the speed and convenience of electronic communications. A desktop scanner or network scanner allows business professionals to scan paper-based documents, manage them effectively and distribute them in a timely fashion. Users can share and distribute information easily by scanning directly to their email or PC fax applications. The growing popularity of fax modems and email is driving the acceptance of scanner-enabled document distribution in offices of all sizes. Fax/modem capabilities, which are available with virtually all modem PCs, enable users to send and receive faxes directly from a computer, at their desk or while traveling, and to check email remotely.

Nevertheless, while scanners are ideal for users who need to disseminate paper-based information to colleagues through PC facsimile and/or email, traditional flatbed scanners lack the convenience and flexibility that users have become accustomed to through such products as notebook computers and cellular phones. Hand-held scanners are an improvement in this regard; however, they are typically dependent on a host computer for displaying the scanned images and for providing power. U.S. Pat. No. 5,550,938 to Hayakawa et al. (hereinafter Hayakawa) discloses a portable image scanner designed to overcome these disadvantages. Specifically, Hayakawa discloses a hand-held cordless image scanner having a display/control screen, a memory for storing scanned images, a self contained power supply and an interface that allows the scanner to be received by a host computer as a memory card for transferring stored images from the scanner to the computer. While Hayakawa's scanner is effective in breaking the dependency on a host computer for image display and power, it still has several drawbacks. For example, Hayakawa's scanner offers no image processing features other than the capabilities of storing or discarding a newly scanned image and reviewing those images that have been stored previously. More advanced image processing would necessarily be done after transfer to a host computer. Moreover, Hayakawa does not offer a graphical user interface (GUI) containing icons and/or animations to assist users in operating their device. Finally, transfer of images is limited to those devices having ports for receiving an external memory card or the capability of reading the scanner memory through a memory card drive.

Accordingly, what is sought is a portable, hand-held image capturing device that allows users to process or manipulate captured images in the device and the ability to communicate the images directly to some other unit such as a computer, printer, or facsimile machine. In addition, the image capturing device should provide cordless operation and use a standard interface for transferring images to other devices. A GUI is preferred to assist users, particularly novices, in operating the device.

SUMMARY OF THE INVENTION

Certain objects, advantages, and novel features of the invention will be set forth in the description that follows and will become apparent to those skilled in the art upon examination of the following or may be learned with the practice of the invention.

To achieve the advantages and novel features, the present invention is generally directed to a portable hand-held image capture and communication appliance and method of using same by which images may be captured via capturing means and saved in an internal memory. The appliance includes a processor for manipulating and exhibiting the images on a built-in display screen. Program code stored in the internal memory includes a send page or image module that allows the user to transfer or receive image data to or from another appliance, device or system.

According to an aspect of the invention, the program code includes a page selection module that provides the user with a list of possible actions and processes responses thereto.

The page selection module controlling the transfer of image data to an external device includes code segments for the selection of data to be transmitted to an external device. Data is selected by selecting metaphoric page icons, each metaphoric page icon corresponding to a page of captured information. Metaphoric page icons may be selected by selecting the icons individually, by selecting a predefined group of icons, by selecting tagged icons, or by selecting all icons. A default selection includes selecting the current metaphoric page icon displayed on the display According to another aspect of the invention, the page selection module includes code segments for attempting an image transfer over one or more alternative communication ports if the transfer over the first communication port was unsuccessful. In the preferred embodiment, transfers are attempted first over the appliance's serial port and second over the appliance's infra red (IR) port. The send page module controls establishment of a communication link over the second communication port. During this link setup or discovery interval, an animation is displayed that symbolizes the appliance connecting with the target device. In the preferred embodiment, the communication link establishment animation shows a tower emanating waves to simulate a radar or sonar system. While the image transfer is in progress, the aforementioned transfer animation is displayed. The send page module monitors the status of the link to detect an interruption in communication. Should the link go down, the communication link establishment animation is displayed to notify the user that the link needs to be established again. A status bar on the display is updated with a message explaining that the communication link has been dropped to distinguish the interruption animation from an initial link setup.

The appliance according to the present invention has many advantages, a few of which are highlighted hereafter, as examples.

One advantage of the invention is that intelligent image processing features, normally reserved for a traditional computer, are provided in a portable, hand-held image capturing appliance.

Another advantage of the invention, is that captured images can be transferred to another appliance, device, or system for further processing. This is particularly useful when the other device is a printer so that paper copies of the images can be obtained.

Still another advantage of the invention is that the appliance can transfer images over multiple communication ports, which in the preferred embodiment comprise a serial port and an IR port.

A further advantage of the invention is that the appliance automatically selects which communication port to use without requiring input from the user, which makes the appliance easier to operate.

Yet another advantage of the invention is that a GUI is provided, including metaphoric icons and animations, that allows new users to operate the appliance with minimal training or assistance.

BRIEF DESCRIPTION OF THE SEVERAL VIEWS OF THE DRAWINGS

Other features of the present invention will be more readily understood from the following detailed description of specific embodiments thereof when read in conjunction with the accompanying drawings, in which.

DETAILED DESCRIPTION OF THE PREFERRED EMBODIMENT

Figure 1A:
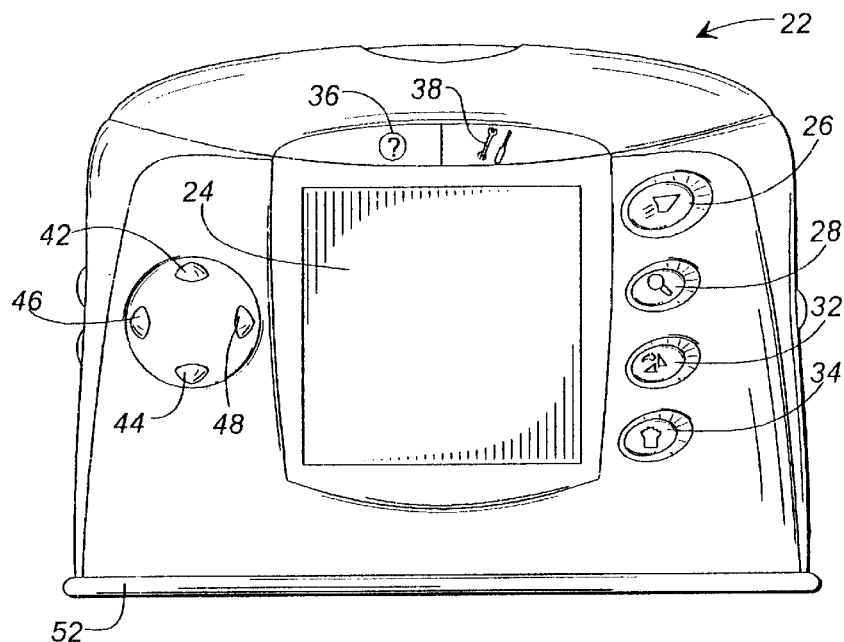
FIG. 1A is an elevation view of the hand-held image capture and communication appliance according to the present invention, which depicts a side of the unit containing the display screen, operation buttons, and navigation buttons.

While the invention is susceptible to various modifications and alternative forms, a specific embodiment thereof is shown by way of example in the drawings and will herein be described in detail. It should be understood, however, that there is no intent to limit the invention to the particular form disclosed, but on the contrary, the invention is to cover all modifications, equivalents, and alternatives falling within the spirit and scope of the invention as defined by the claims.

Architecture of the Image Capture and Communication Appliance

A portable, hand-held, image capture and communication appliance 22 embodying the principles of the present invention is shown in FIGS. 1A through 1D. Specifically, FIG. 1A depicts one side (i.e., front) of appliance 22 where a flat-panel display 24 along with user operation buttons 26, 28, 32, 34, 36, 38 and user navigation buttons 42, 44, 46, 48 are located. Display 24 is preferably of the flat-panel variety to accommodate the hand size dimensions of appliance 22. Common types of flat-panel displays suitable for use in the present invention include electroluminescent displays, gas plasma discharge displays, and liquid crystal displays (LCDs). Display 24 is the means by which information, including captured images, text, icons, and animations, is communicated to the user. As used herein, the term "image" encompasses both text (binary) and color, graphic, or grayscale visuals. The user operation buttons comprise an image send or transmit button 26, an image zoom button 28, an image rotate button 32, an image delete button 34, a help utility button 36 and a tools menu button 38. Send, zoom, rotate, and delete buttons 26, 28, 32 and 34 allow the user to electronically manipulate an image or page that has been captured into memory through photoelement array 52. Note that an image captured in memory is interchangeably referred to herein as a "page" because the image is portrayed in appliance 22 as a physical page of text and/or imagery. Activation of tools button 38 presents the user with a menu that includes possible image operations (e.g., image attachment/grouping, image detachment/ungrouping), changing the mode of appliance 22 (i.e., toggling between text (binary) capture and color, graphic, or grayscale capture modes), calibrating appliance 22, displaying a screen identifying important specifications such as a model number, hardware or software release number, memory equipage, etc., or other user utilities not deserving of a dedicated external button for activation. Help button 36 provides the user with access to general tutorials, process animations, how-to instructions on the operation of appliance 22, and context sensitive instruction when help is requested while another operation or menu is active. The navigation buttons include an up button 42, a down button 44, a left button 46, and a right button 48 and are controlled by the user to steer a course through menu items and to view images or pages that have been captured in memory.

Figure 1B:
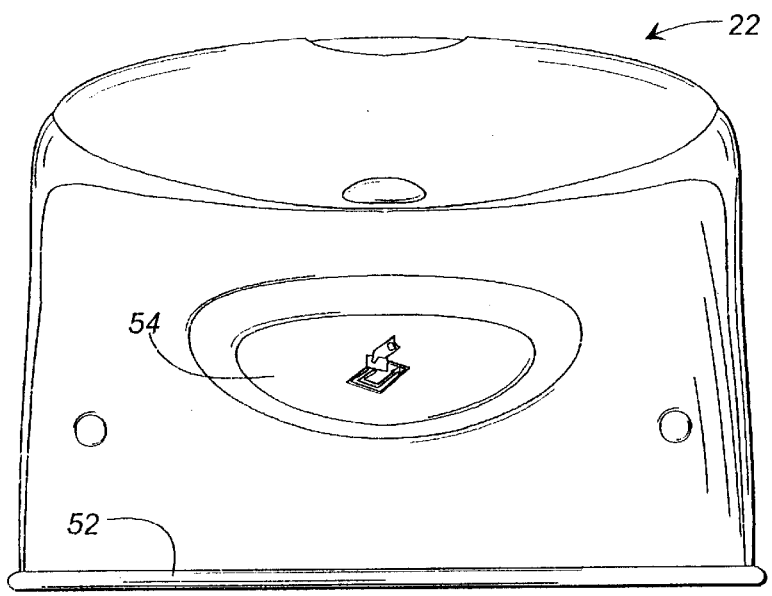
FIG. 1B is an elevation view of the appliance of FIG. 1A depicting the opposing side to that illustrated in FIG. 1A, which contains the capture button for performing an image capture.
Figure 1C:
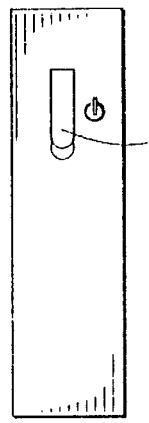
FIG. 1C is an elevation view of the appliance of FIGS. 1A and 1B depicting an end of the unit, which contains the power switch.
Figure 1D:
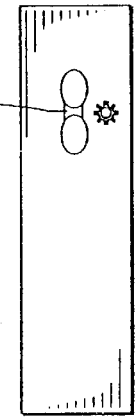
FIG. 1D is an elevation view of the appliance of FIGS. 1A, 1B, and 1C depicting the opposing end to that illustrated in FIG. 1C, which contains a brightness button for adjusting the visual clarity of the display screen.

FIG. 1B shows the side of appliance 22 opposite that illustrated in FIG. 1A (i.e., back). The back side of appliance 22 includes image capture button 54, which is depressed by a user to capture an image through photoelement array 52 and is released once the image is captured. A power switch 56 is included at one end of appliance 22 as shown in FIG. 1C and a brightness control 58 for display 24 is located at the other end of appliance 22 as shown in FIG. 1D. The positioning of the various buttons, power switch 56, and brightness control 58 on appliance 22 as shown in FIGS. 1A through 1D is merely exemplary and can be modified as needed to satisfy the ergonomic requirements of the targeted user community.

Figure 2:
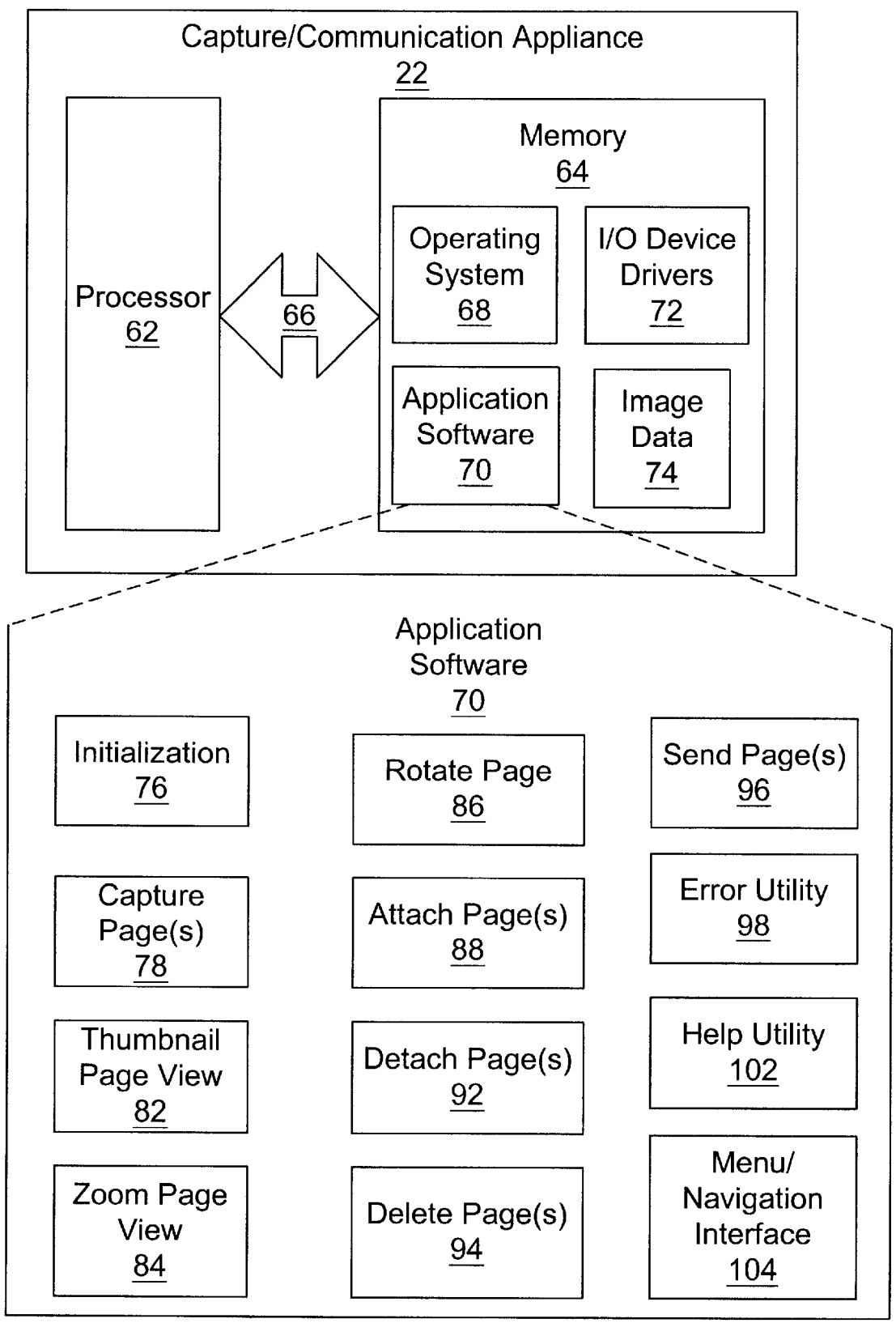
FIG. 2 is a high-level block diagram of the internal hardware and software architecture of the appliance illustrated in FIGS. 1A–1D.

Referring now to FIG. 2, the internal architecture of appliance 22 will be described hereafter. Appliance 22 includes a processor 62, which communicates with a memory 64 via address/data bus 66. Processor 62 can be any commercially available or custom microprocessor suitable for an embedded application. Memory 64 is representative of the overall hierarchy of memory devices containing the software and data used to implement the functionality of appliance 22. Memory 64 can include, but is not limited to, the following types of devices: cache, ROM, PROM, EPROM, EEPROM, flash, SRAM, and DRAM. As shown in FIG. 2, memory 64 holds four major categories of software and data used in appliance 22: the operating system 68; the application software 70; the I/O device drivers 72; and the image data 74 generated for each capture. Operating system 68 should be designed for real time embedded applications and, preferably, is relatively compact to make the most efficient use of memory 64. One such example of a real time operating system meeting these criteria is the PSOSYSTEM operating system (pSOSystem® or pSOS®) sold by Integrated Systems, Inc., 3260 Jay Street, Santa Clara, Calif. 95054-3309, which is used in the preferred embodiment of the present invention. I/O device drivers 72 include software routines accessed through operating system 66 by application software 70 to communicate with devices such as display 24, certain memory components 64 and I/O ports such as a serial port or IR port for transferring data to another appliance, device or system. The digital representations of the images captured by appliance 22 is denoted by image data 74. The format used for storing the images should be compatible with application software 70. One common format used for encoding images is the CCITT standard, which is used in the preferred embodiment of the present invention; however, other public or proprietary standards can be used with equal success. For example, JPEG is a common standard used to encode graphic or color images. Finally, application software 70 comprises the control programs that implement the various features of appliance 22. Application software 70 and devices drivers 72 are typically written in a high-level programming language such as C or C++ for development convenience. Nevertheless, some drivers or application modules are sometimes written in assembly or machine language to optimize speed, memory usage or layout of the software in memory. In the preferred embodiment, the present invention uses C language to implement most application software 70 and device drivers 72. Assembly language is used to implement time critical code segments.

Application software 70 can be broken into several modules corresponding to the various features of appliance 22, as shown in FIG. 2. These software modules include an initialization module 76, a capture page module 78, a thumbnail view module 82, a zoom view module 84, a page rotation module 86, an attach page module 88, a detach page module 92, a delete page module 94, a send page module 96, an error utility module 98, a help utility module 102 and a menu/navigation interface module 104. A brief overview of each of the aforementioned modules follows hereafter.

Figure 8A:
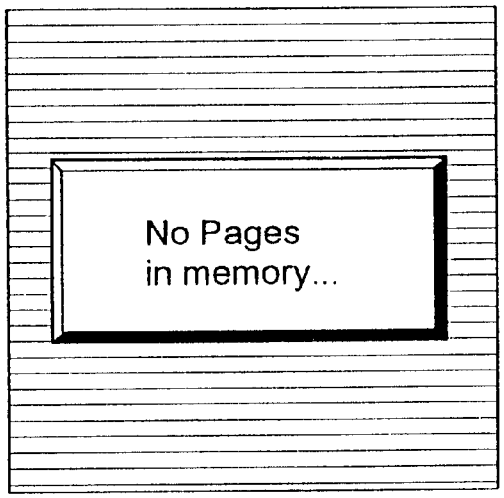
FIGS. 8A and 8B depict memory usage indicator icons on the display screen of FIG. 1A that provide a memory utilization report for the appliance.
Figure 8B:
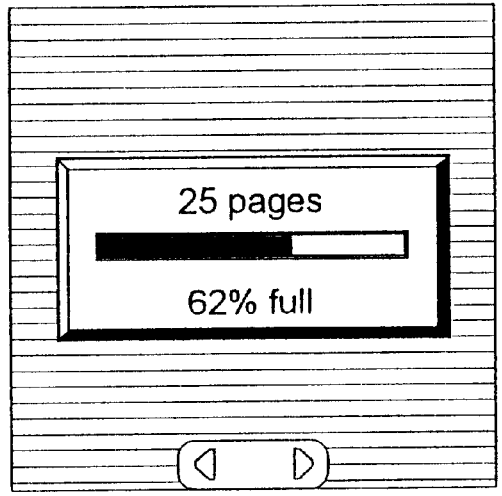
Figure 8D:
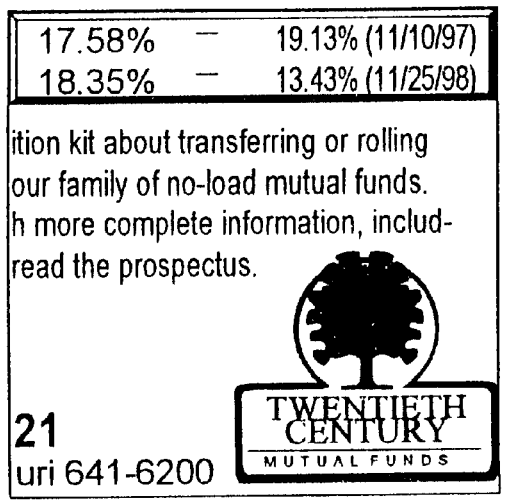
FIG. 8D illustrates a zoom view of a captured image on the display screen of FIG. 1A.
Figure 8C:
FIG. 8C illustrates a thumbnail view of a captured image on the display screen of FIG. 1A.

Initialization module 76 contains the boot software that is invoked when appliance 22 powers up. This module works closely with operating system 68 and device drivers 72 to perform any hardware initialization for processor 62, memory devices 64, display 24, and software initialization for global resources, such as message queues and buffers, system tasks, and memory partitions. Capture page module 78 controls the acquisition of images through photoelement array 52 and their conversion into a suitable format for storage in memory 64. Thumbnail view module 82 provides the default visual for pages and icons shown on display 24. For example, FIGS. 8A and 8B show a memory usage indicator icon for the cases where memory 64 is empty (i.e., no captured pages in memory) and where memory 64 holds 25 captured pages. In FIG. 8C, thumbnail view module 82 presents an entire captured page on display 24. Zoom view module 84 allows the user to magnify a portion of a page as illustrated in FIG. 8D. Page rotation module 86 allows the user to rotate a page either in thumbnail or zoom view in 90° increments. Attach page module 88 allows the user to logically join pages together to form a group of pages that can be manipulated as an individual unit. Conversely, detach page module 92 allows the user to separate a page or pages from a previously formed group. Delete page module 94 allows the user to purge a page or group of pages from memory 64. Send page module 96 allows the user to transfer a page or group of pages to another appliance, device or system through the serial or IR communication ports of appliance 22. The operation of send page module 96 will be discussed in detail hereinafter. Error utility module 98 provides notification to the user when the user attempts an invalid operation. Help utility module 102 provides the user, in real time, with general instructions through text and animation for operating appliance 22 and context sensitive instructions for performing a specific operation. Lastly, menu/navigation interface module 104 provides the user with graphical menus for performing various operations and processes the user's response thereto. Moreover, menu/navigation interface module 104 responds to navigation buttons 42, 44, 46, and 48 that allow the user to steer a course through the graphical menus and view the stored pages.

Figure 3:
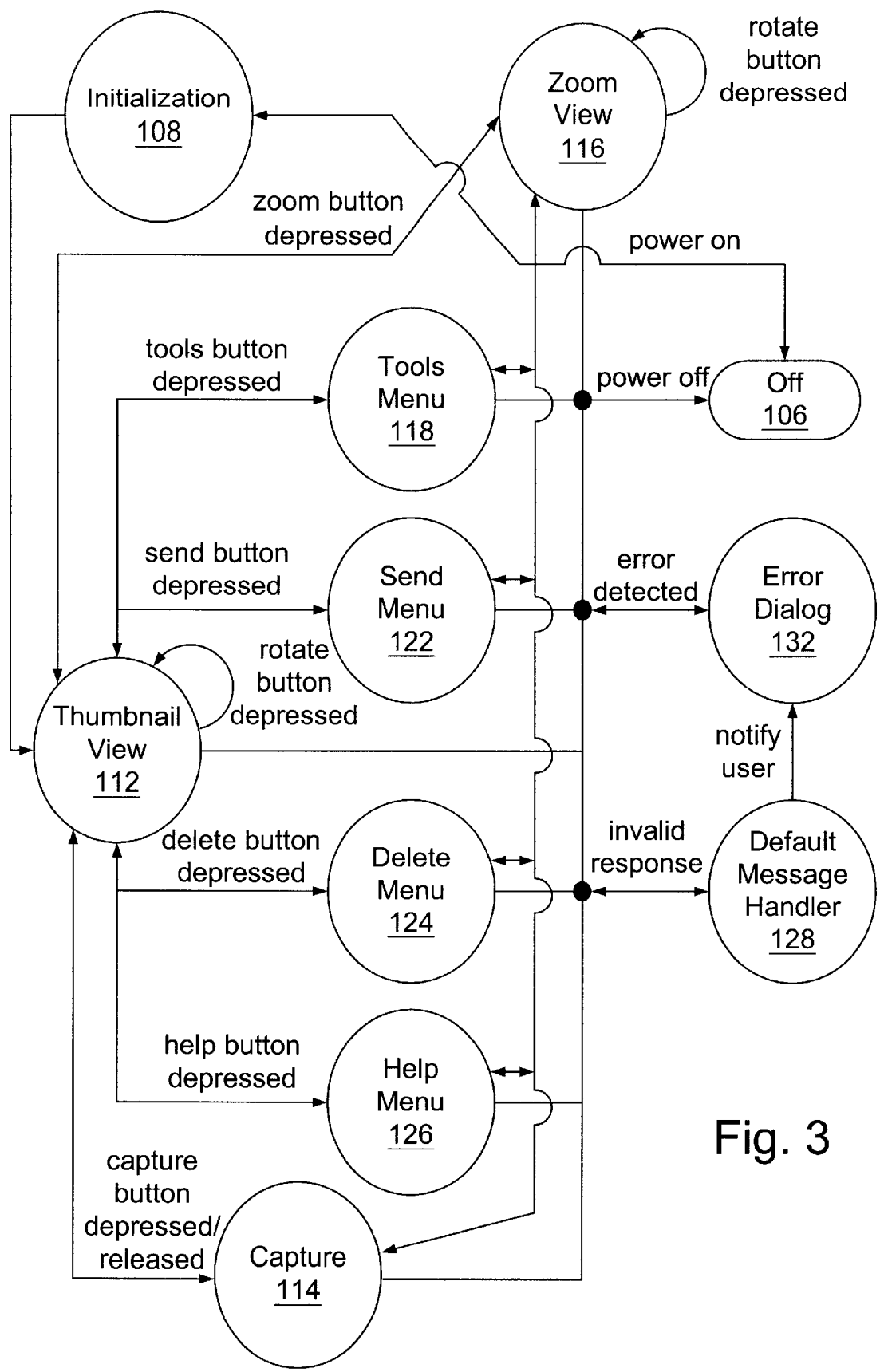
FIG. 3 is a high-level state diagram of the application software of FIG. 2.

A high level state diagram for application software 70 is shown in FIG. 3. This state diagram is useful for gaining a broad understanding of the operation of application software 70 and its associated software modules. These states are representative of tasks or processes in application software 70 that act on messages from a message queue, which are generated as a result of user interaction with appliance 22 (i.e., activation of buttons). Appliance 22 and application software 70 begin and terminate from the off state 106, which is controlled by the user through operation of power switch 56. Off state 106 can clearly be entered from any other state in response to a user turning appliance 22 off through switch 56. When a user turns switch 56 to the on position, the system will pass through a transient initialization state 108 during which time initialization module 76 is invoked to perform its functions. Once system initialization is complete, the system enters the thumbnail view state 112, which is the default state for viewing any captured images. From thumbnail view state 112, the system can transition to any one of several possible states depending on the action by the user. For example, the capture button can be pressed to enter capture state 114 to perform an image capture. After the image is captured, the button is released to return to thumbnail view state 112. If the user wishes to change the orientation of the captured image, then activation of rotation button 32 will rotate the captured image 90° with each invocation. Moreover, now that an image is captured in memory 64, a user can obtain a magnified view of a portion of the image or page by pressing zoom button 28 to enter zoom view state 116. Similar to thumbnail view state 112, the magnified image can also be rotated through application of rotation button 32. The system will return to thumbnail view state 112 through operation of zoom button 28.

Figure 4A:
FIGS. 4A and 4B illustrate the tools menus displayed on the display screen of FIG. 1A.
Figure 4B:
Figure 5:
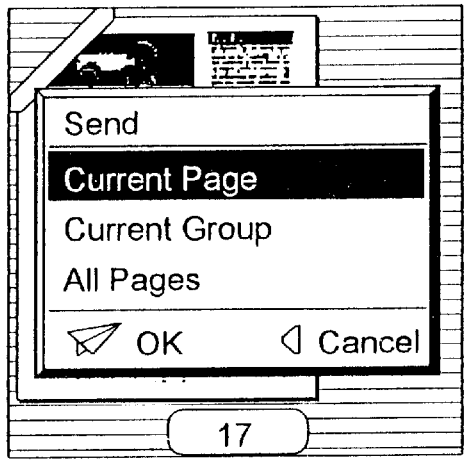
FIG. 5 illustrates the send menu displayed on the display screen of FIG. 1A.
Figure 6:
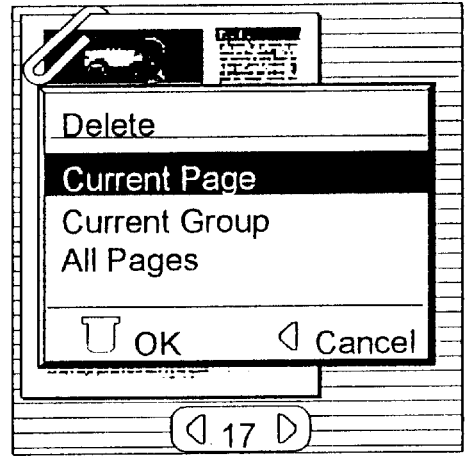
FIG. 6 illustrates the delete menu displayed on the display screen of FIG. 1A.
Figure 7:
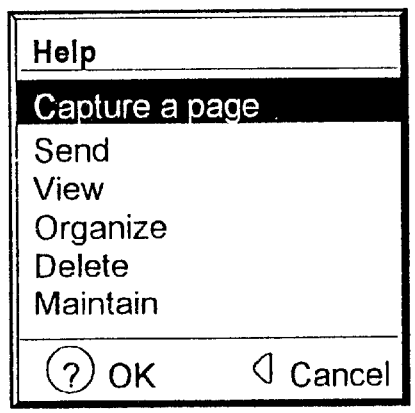
FIG. 7 illustrates the help menu displayed on the display screen of FIG. 1A.

From thumbnail view state 112 or zoom view state 116, one of four menu states can be entered depending on the choice made by the user. First, activation of tools button 38 will transition the system into tools menu state 118 where a menu of possible page operations and/or features is exhibited on display 24 as illustrated in FIGS. 4A and 4B. Second, activation of send button 26 will transition the system into send menu state 122 where a menu of options for transferring a page or group of pages to another appliance, device or system is exhibited on display 24 as illustrated in FIG. 5. Third, activation of delete button 34 will transition the system into delete menu state 124 where a menu of options for deleting a page or group of pages from memory 64 is exhibited on display 24 as illustrated in FIG. 6. Lastly, activation of help button 36 will transition the system into help menu state 126 where a menu of help topics is exhibited on display 24 as illustrated in FIG. 7. Once any of the aforementioned menu states is reached, the user can choose a desired menu option by using navigation buttons 42 and 44 and then validating the choice by pressing a confirmation button. In the preferred embodiment of the present invention, the confirmation button is simply the button by which the present menu on display is accessed. An icon indicating the appropriate confirmation button is displayed in the lower left hand side of the menus as illustrated in FIGS. 4 through 7. Menu states may be exited by simply invoking navigation button 46 to transition to a previous state.

An invalid response by the user (i.e., user presses an inactive button) will result in a transition to the default message handler state 128 where the user response is interpreted through the message that was generated internally. Frequently, the invalid response by the user will simply be ignored. Nevertheless, depending on the button that was invoked and the current state of application software 70, a transition is sometimes made to the error dialog state 132 to notify the user of their error via a message or graphic (e.g., a blinking icon) on display 24. Alternatively, error dialog state 132 can be entered directly if application software 70 detects an error in the execution of a valid operation. The most common example of this is when the user follows an improper capture path with appliance 22 during the image capture process.

The features provided by the send page software module 96 will be described hereafter with frequent reference to (a) the architecture and operation of the application software 70 of FIG. 2; (b) the send menu of FIG. 5; (c) the flow charts of FIGS. 9A, 9B, and 9C; and (d) the animation scene illustrations of FIGS. 10, 11, and 12.

Operation of the Send Page Feature

The operation of the send page feature is described hereafter by way of example of a transfer of data from appliance 22 to another device or appliance. The send or transfer concepts are equally applicable, however, for receiving or downloading data from another device into appliance 22. The send or transfer page feature of appliance 22 is exercised through send button 26, which displays the send menu illustrated in FIG. 5. Thus, as represented by decision diamond 134 in FIG. 9A, the process begins with menu/navigation interface module 104 (see FIG. 2) processing a message indicating that send button 26 has been activated. Depending on the current state of application software 70, this response may not be valid as indicated by decision diamond 136. If send button 26 is not currently active or live, error utility software module 98 may optionally be invoked to notify the user that send button 26 is presently inactive in step 138. If, however, send button 26 is active, the process continues by following termination A where the send menu is exhibited on display 24 (see FIG. 1A) in step 142 as shown in FIG. 5. The current page option is highlighted as the default action in step 146 as depicted in FIG. 5.

Referring now to FIG. 5, three send or transmit options are offered to the user: send the current page, send the current group, or send all pages stored in memory 64 (see FIG. 2). The first option of sending the current page, which is chosen as the default in the preferred embodiment, allows the user to send or transmit whatever page is currently displayed on display 24 (see FIG. 1A). Thus, whether the current page is displayed in thumbnail view (e.g., FIG. 8C), is displayed in zoom view (e.g., FIG. 8D), is the inner page of a group of pages (e.g., FIG. 5) that have been logically joined through attach page module 88 (see FIG. 2), or is the first page of a group of pages, that page will be selected for transmission. The second option allows the user to send or transmit the group of pages of which the current page displayed on display 24 is a member. The entire group will be transmitted irrespective of whether the current page on display is the first or an inner page of the group. Finally, the third option allows the user to transmit all pages stored in memory. This option can be used even if no page is currently on display such as the example shown in FIG. 8B where the memory usage indicator icon is displayed.

The send menu options discussed in the foregoing are used in the preferred embodiment of the present invention. Nevertheless, alternative send or transmit options can be used to adapt to changing or differing user preferences. For example, a skilled programmer may wish to design application software 70 such that a user could electronically tag or mark pages stored in memory 64 by pressing a button when they are displayed. A fourth option could then be added to the send menu of FIG. 5 allowing the user to send or transmit those tagged or marked pages when send page module 96 (see FIG. 2) is invoked through send button 26.

Returning now to FIG. 9A, the user can choose between the aforementioned send or transmit options using navigation buttons 42 and 44 (see FIG. 1A) as indicated by decision diamond 148. As the user moves between options, the currently selected option will be highlighted in step 152. Once a selection is made, the send process continues at termination B. As shown in FIG. 5, options from the send menu can be confirmed using send button 26 or the menu can be exited through activation of navigation button 46. Thus, at decision diamond 154, if the send menu is exited, the send process ends at step 156 by removing the menu from display 24 and returning the display to the previous view (i.e., the view on display prior to invocation of send button 26). Otherwise, if an option is confirmed through invocation of send button 26, control will be transferred to send page module 96 at decision diamond 158.

Figure 9A:
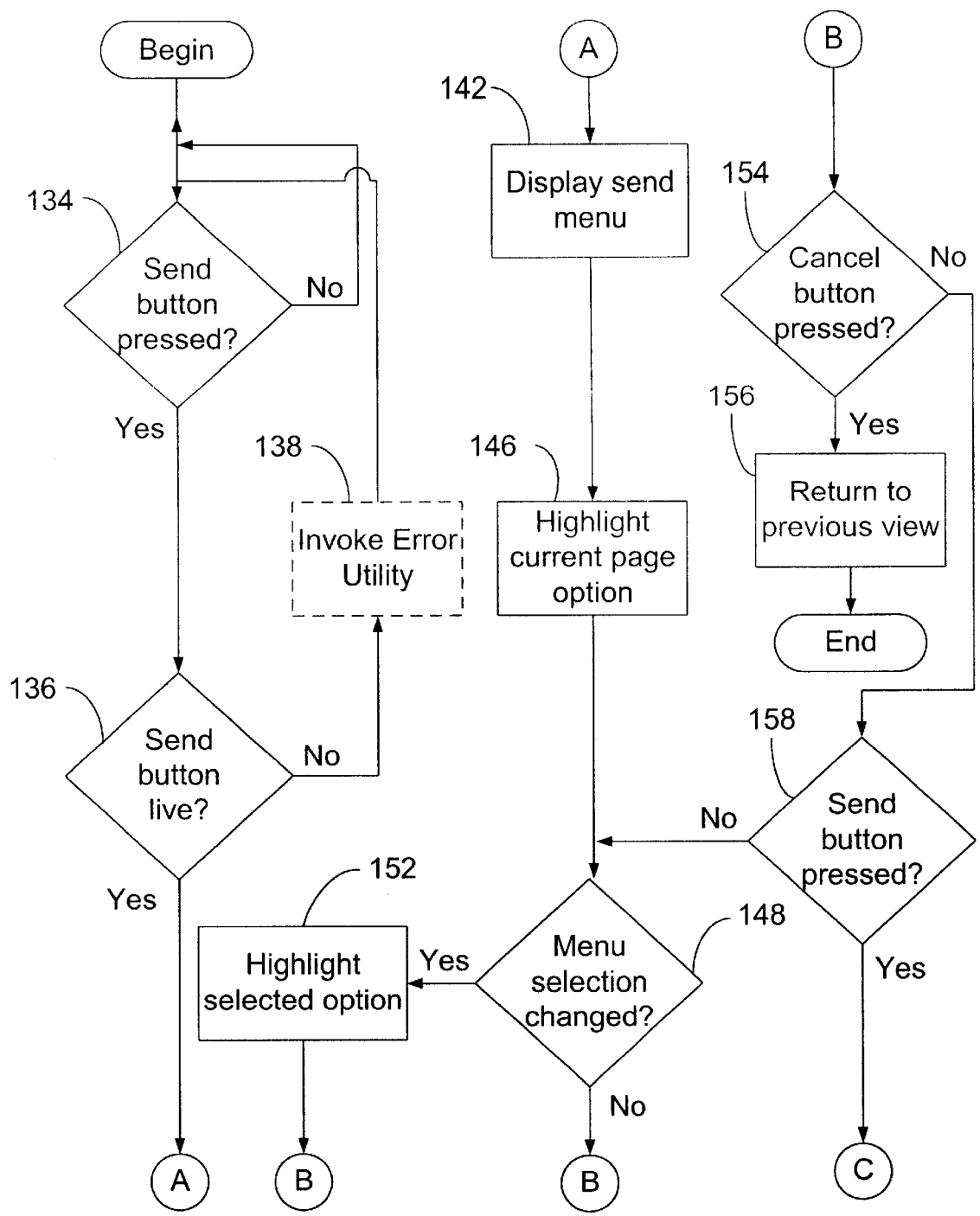
FIGS. 9A, 9B, 9C, and 9D are a flow chart describing the operation of the send page software module of FIG. 2.
Figure 9B:
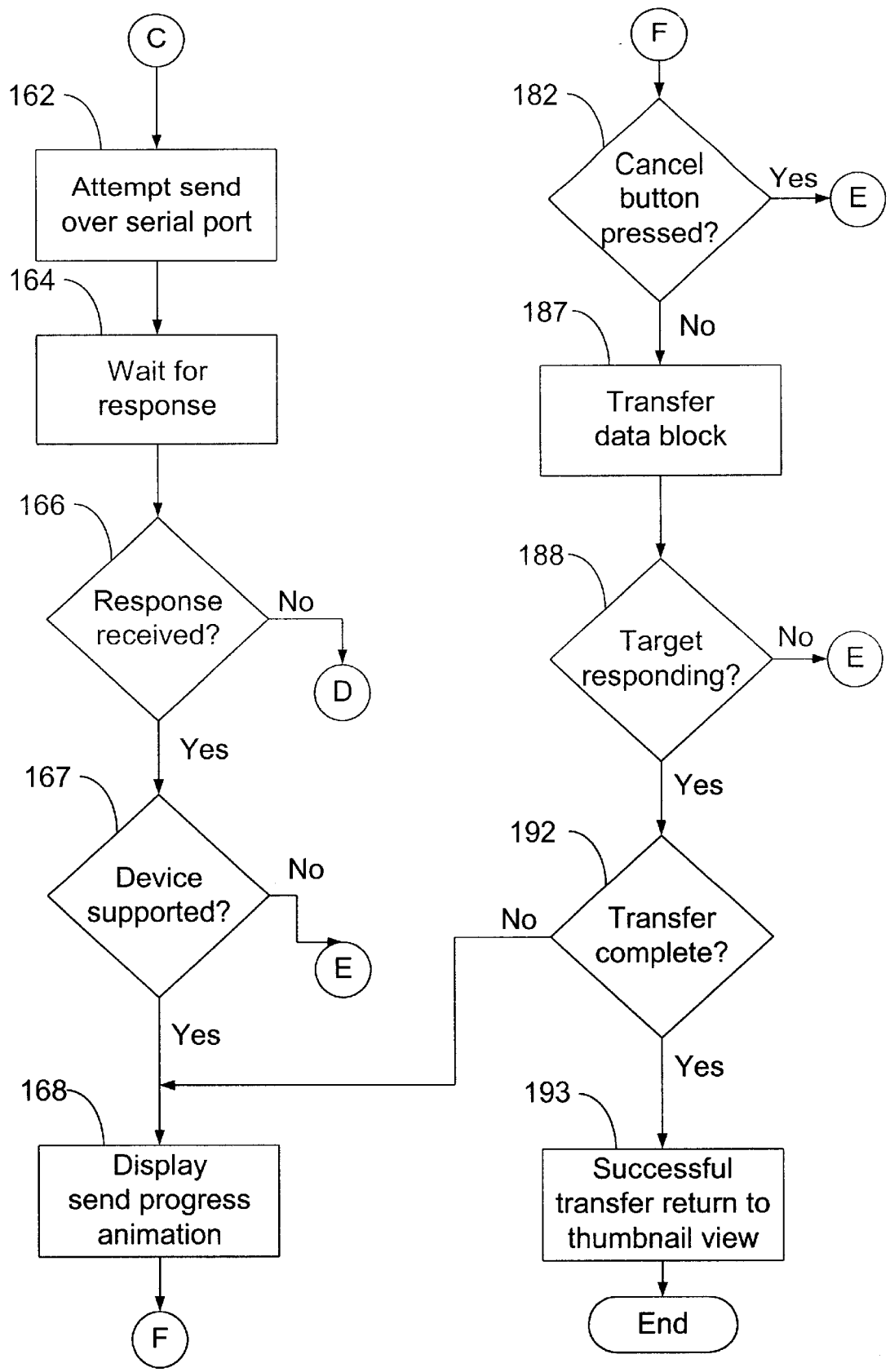

Following termination C in FIG. 9B, an attempt is made initially to send the page(s) first over the serial port in step 162. Send page module 96 waits for a predetermined timeout period, which is typically one second, in step 164. If no response is received within the timeout period, a determination is made at decision diamond 166 to attempt an IR transmit, which begins at termination D. If, however, the serial link is established, a determination must still be made at decision diamond 167 whether the serial device that has responded is among those devices that appliance 22 supports for communication. This can be accomplished, for example, by maintaining a database of supported devices in memory 64. During the handshaking process between appliance 22 and the target device, the target device communicates its identification, which can then be compared with the device database in memory 64 by send page module 96. If an entry for the target device is not found in the supported device database, the process continues at termination E (see FIG. 9D) where control is passed to error utility module 92 (see FIG. 2). Error utility module will display a textual message on display 24 in step 184 explaining that communication with a serial device has been aborted because the device is unsupported. In general, navigation buttons 42 and 44 can be used to review messages that cannot fit entirely on display 24. Once review of the error message is complete, the user can exit the error dialog in step 186 by pressing navigation button 46. If the responding serial device is supported, send page module 96 displays a send progress animation in step 168 on display 24.

Figure 10:
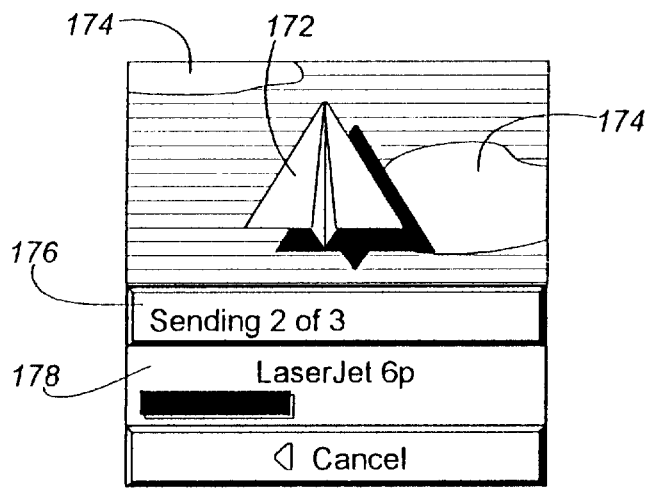
FIG. 10 illustrates a scene from the send progress animation on the display screen of FIG. 1A.

The send progress animation provided by send page module 96 in step 168 is designed to convey to the user that pages or images are being transferred from appliance 22 to another appliance, device or system. In the preferred embodiment of the present invention this is accomplished through an animation, a scene of which is depicted in FIG. 10. While the send or transmit is in progress, an icon that serves as a metaphor for the page transfer is placed in simulated motion on display 24 to confirm in the user's mind that a page transfer is taking place. A paper airplane 172 seeming to move through clouds 174 is the iconic metaphor chosen for the preferred embodiment as shown in FIG. 10; however, any suitable symbol can be used that is shown to leave users with the impression that a page transfer is in progress. Additional visual cues are provided to apprise the user of the status of the page transfer. For example, status bar 176 is used to identify how many pages have been selected for transfer and to point out which page is currently being sent. Display region 178 can be used to display the type of appliance or device to which the pages are being transferred (assuming that information was acquired during the handshaking protocol executed in step 162). A bar graph can optionally be included to graphically portray the progress made in transferring the selected pages.

A user can interrupt a serial port page transfer session while still in progress by pressing navigation button 46. If menu/navigation module 104 (see FIG. 2) determines that the page transfer session is canceled at decision diamond 182, the process continues at termination E (see FIG. 9D) where control is passed to error utility module 92 (see FIG. 2). Error utility module will display a textual message on display 24 in step 184 explaining that a serial page transfer has been aborted. The user can exit the error dialog in step 186 by pressing navigation button 46. If the user decides not to cancel the communication session, the data is transferred between appliance 22 and the target device or appliance in step 187.

In addition to menu/navigation module 104 checking for a cancellation of the page transfer by the user, send page module 96 monitors, in parallel, at decision diamond 188 whether the target device continues to acknowledge receipt of the transmitted pages. If communication is lost with the target, control is passed to error utility module 92 by following termination E to step 184 where a textual message is displayed on display 24 explaining that the serial communication link has been dropped. The error dialog can be exited as discussed in the foregoing.

As represented by decision diamond 192, the send progress animation discussed with respect to step 168 will continue to be displayed until the transfer is complete. Moreover, the user can cancel the transfer (see decision diamond 182) or the target may fail to respond (see decision diamond 188) any time during the transfer. If the target device acknowledges receipt of all transmitted page(s), then the serial port page transfer has been successful as indicated by step 193. At completion of the transfer, send page module 96 terminates the send progress animation and returns to a thumbnail view of the image displayed on display 24 prior to invocation of send button 26.

Figure 9C:
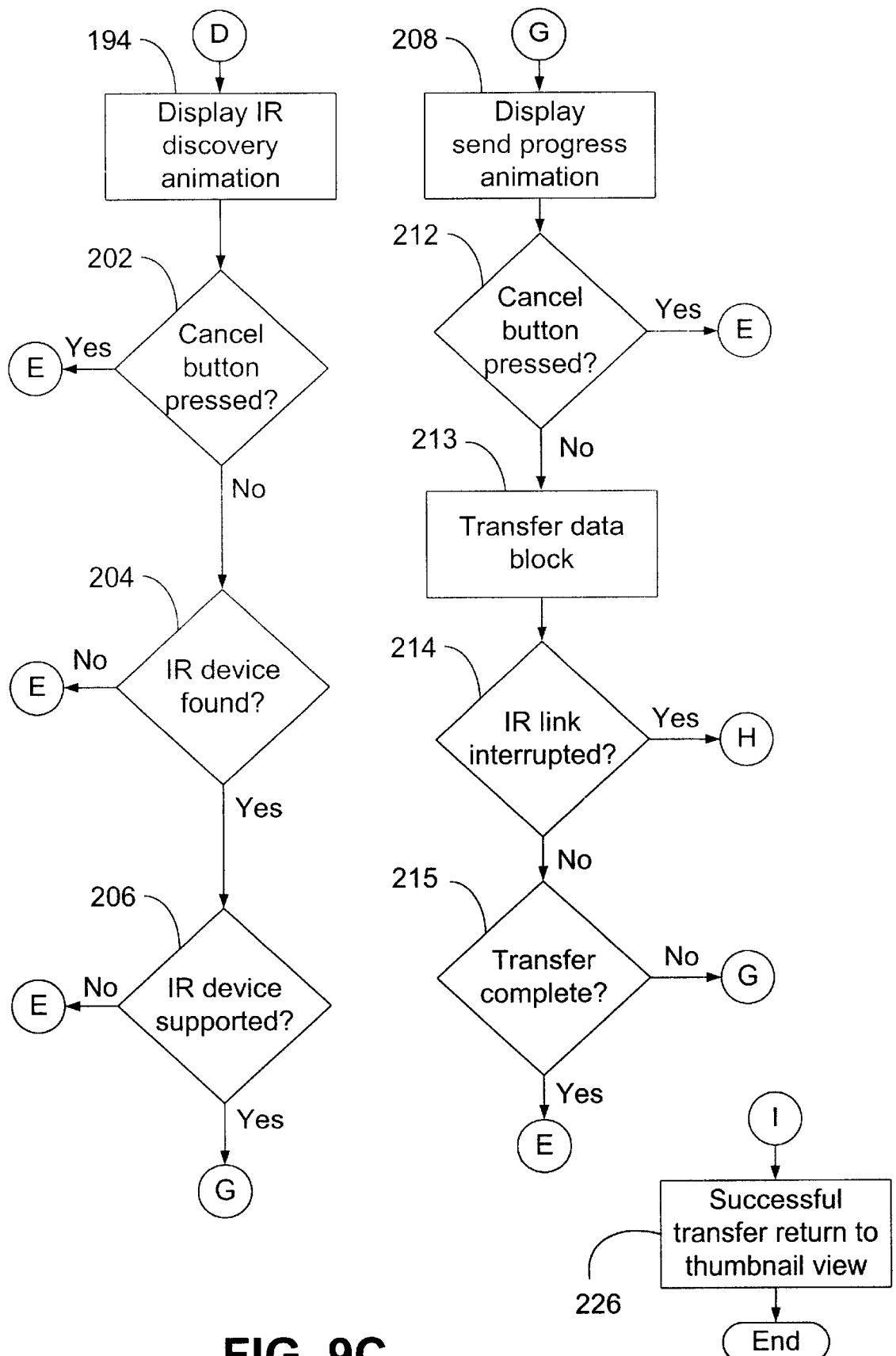
Figure 11:
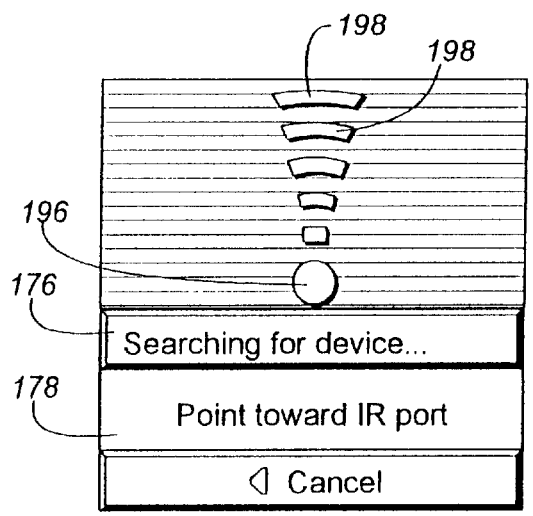
FIG. 11 illustrates a scene from the IR port discovery animation on the display screen of FIG. 1A.

Recall that at decision diamond 166, if no response was received within the timeout period when initiating a page transfer over the serial port, an IR transfer attempt is made by following termination D to FIG. 9C. Thus, assuming a timeout occurred at decision diamond 166, send page module 96 then displays an IR discovery animation on display 24 in step 194. The IR discovery animation provided by send page module 96 in step 194 is designed to convey to the user that an IR link is being established between appliance 22 and another appliance, device or system. In the preferred embodiment of the present invention this is accomplished through an animation, a scene of which is depicted in FIG. 11. While appliance 22 attempts to establish the IR link, an icon that serves as a search metaphor is used in an animation on display 24 to impress upon the user that a search for a device having an IR port is taking place. A light emitting diode (LED) 196 emanating waves 198 (e.g., simulation of radar or sonar) is the iconic metaphor chosen for the preferred embodiment as shown in FIG. 11. As part of the animation, waves 198 are displayed in cumulative fashion beginning with the wave closest to LED 196 and moving progressively away from LED 196. The shape of the waves is also specifically designed to inform users of the maximum allowable cone angle for the IR port in appliance 22. In the preferred embodiment, the IR port has a maximum cone angle of 30°. Once all waves 198 are shown together on display 24, they are cleared from the display and the process repeats. While an LED and emanating waves are used in the preferred embodiment of the present invention, any suitable symbol can be used that is shown to leave users with the impression that appliance 22 is attempting to establish an IR link with another device. To facilitate establishment of the IR link, status bar 176 is used to inform the user that appliance 22 is searching for the target device. Furthermore, display region 178 can be used to provide instruction such as prompting the user to point appliance 22 toward the IR port in the target device.

A user can interrupt establishment of the IR link by pressing navigation button 46. Similar to the foregoing discussion with respect to decision diamond 182, if menu/navigation module 104 (see FIG. 2) determines that the page transfer session is canceled at decision diamond 202, the process continues at termination E (FIG. 9D) where control is passed to error utility module 92 (see FIG. 2). Error utility module 92 will display a textual message on display 24 in step 184 explaining that the IR page transfer has been aborted. The user can exit the error dialog in step 186 by pressing navigation button 46.

Figure 9D:
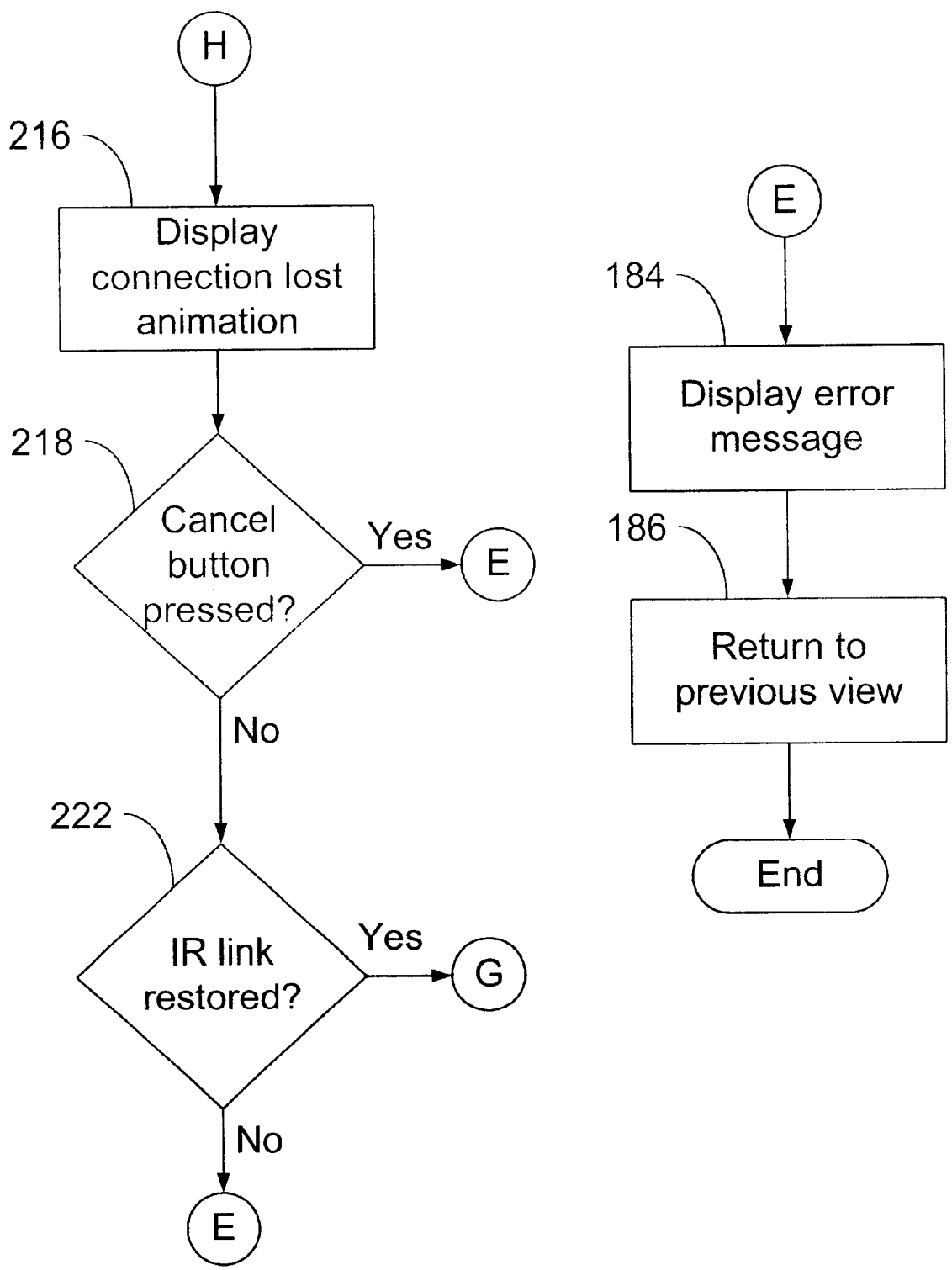

Under the control of send page module 96, appliance 22 will attempt to establish an IR link for a predetermined period of time, which is typically 5 seconds in the preferred embodiment. If no IR device is found and send page module 96 confirms a timeout has occurred at decision diamond 204, control is passed to error utility module 92 at termination E (FIG. 9D). Steps 184 and 186 are carried out as discussed hereinbefore with the exception that the error message displayed explains that no IR device has been found with which to communicate.

If a device is located at decision diamond 204, send page module 96 will then determine at decision diamond 206 whether the device is one capable of processing the page or image data to be transferred. This can be accomplished, for example, by maintaining a database of supported devices in memory 64. During the handshaking process between appliance 22 and the target device, the target device communicates its identification, which can then be compared with the device database in memory 64 by send page module 96. If an entry for the target device is not found in the supported device database, control is passed to error utility module 92 at termination E as discussed hereinbefore. In this instance, the error message displayed in step 184 indicates that the target device is not supported for communication with appliance 22.

Alternatively, if the target device has an entry in the supported device database, the IR page transfer process continues at termination G where send page module 96 displays a send progress animation in step 208 on display 24, which was discussed hereinbefore with respect to step 168 (see FIG. 9B). If menu/navigation module 104 (see FIG. 2) determines that the IR page transfer session is canceled at decision diamond 212 from user activation of navigation button 46, the process continues at termination E where control is passed to error utility module 92 as described previously. Under these circumstances, the error message displayed in step 184 explains that an IR page transfer has been aborted. If the user decides not to cancel the communication session, the data is transferred between appliance 22 and the target device or appliance in step 213.

Figure 12:
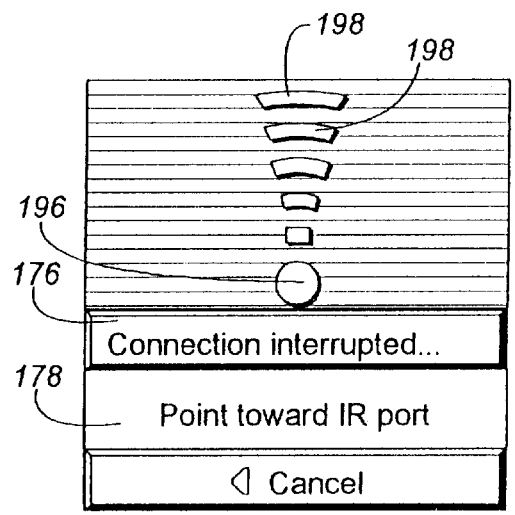
FIG. 12 illustrates a scene from the connection interrupted animation on the display screen of FIG. 1A.

In parallel with menu/navigation module 104 checking for a cancellation of the page transfer by the user, send page module 96 monitors, at decision diamond 214, the status of the IR link. If IR communication is lost with the target, the process continues at termination H in FIG. 9D where send page module 96 displays a connection interrupted animation on display 24 in step 216. The connection interrupted animation is designed to convey to the user that the IR link between appliance 22 and the target device has been interrupted. In the preferred embodiment of the present invention, the IR discovery animation discussed with respect to step 194 is displayed in step 216 as the connection interrupted animation to notify the user that the IR link has been dropped and needs to be reestablished through the IR discovery process. As shown in FIG. 12, the connection lost animation is identical to the IR discovery animation of FIG. 11 with the exception that the message on status bar 176 indicates that a previously established IR connection has been interrupted.

Similar to both the send progress animation of steps 168 and 208 and the IR discovery animation of step 194, the user can cancel the page transfer session through invocation of navigation button 46. If menu/navigation module 104 (see FIG. 2) determines that the page transfer session is canceled at decision diamond 218, the process continues at termination E where error utility module 92 will display a textual message on display 24 in step 184 explaining that the IR page transfer has been aborted.

If the user declines to cancel the IR page transfer as a result of the IR link interruption, send page module 96 suspends the transfer process for a predetermined time period to allow the IR link to be reestablished as represented by decision diamond 222. During this period, which typically ranges from 10 to 40 seconds in the preferred embodiment, the connection lost animation of step 216 is displayed on display 24 instructing the user to point appliance towards the IR port of the target device to reestablish the IR link as shown in FIG. 12. If the IR link is restored, the IR page transfer process resumes at termination G in FIG. 9C where the send progress animation is displayed in step 208 to transfer the remaining pages to the target device. On the other hand, if a timeout occurs, control is passed to error utility module 92 at termination E where a textual message is displayed at step 184 on display 24 indicating the IR link has been lost and the page transfer has been aborted.

Finally, if the IR page transfer is not canceled at decision diamond 212 and the IR link is not interrupted at decision diamond 214, then the send progress animation discussed with respect to step 208 will continue to be displayed until the transfer is complete as represented by decision diamond 215. If the target device acknowledges receipt of all transmitted page(s), then the IR link page transfer has been successful as indicated by step 226. At completion of the transfer, send page module 96 terminates the send progress animation and returns to a thumbnail view of the image displayed on display 24 prior to invocation of send button 26.

The send page feature of appliance 22 discussed herein with primary reference to FIGS. 9A, 9B, and 9C adopts the convention that page transfers are attempted over the serial port first. If no response is received over the serial port, then, and only then, is an attempt made to transfer pages over the IR link. It will be appreciated by those skilled in the art that alternative designs can be implemented without departing from the principles of the present invention. For example, send page module 96 could be designed to attempt page transfers over both the serial port and IR port simultaneously. If both connections are established, one communication mode can be chosen as the default. Otherwise, appliance 22 could carry out the page transfer over whichever communication path was successfully established. According to another alternative embodiment, the user could be provided with a menu allowing them to choose between a serial page transfer or an IR page transfer. Appliance 22 would then attempt a transfer over the user's choice first and if that fails, prompt the user with the option of attempting the transfer using the other communication mode.

Furthermore, the concepts of the invention have been disclosed through reference to an exemplary embodiment in which only two communication ports (serial port and IR port) are used. The concepts can readily be applied to an appliance that includes any number of communication ports for any type of communication link. For example, instead of or in addition to the serial port and the IR port, the appliance may include a Universal Serial Bus (USB) port and/or an IEEE 1394 (a.k.a. FireWire) port.

It is important to emphasize that while the present invention has been illustrated herein with reference to an image capture and communication appliance, the GUI and human-machine interface features of the present invention are applicable to any device or appliance that stores information as data entities or files. Examples of such devices include digital cameras, video recording devices (e.g., video stored in digital form), audio recording devices (e.g., audio stored in digital form), portable fax machines, desktop, laptop, and hand-held computing devices. Furthermore, it is envisioned that the methods disclosed herein for transferring data between an image capture appliance and another device can likewise be used in any device or appliance that stores data and has the necessary communication hardware.

Application software 70, which comprises an ordered listing of executable instructions for implementing logical functions, can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can contain, store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection (electronic) having one or more wires, a portable computer diskette (magnetic), a random access memory (RAM) (magnetic), a read-only memory (ROM) (magnetic), an erasable programmable read-only memory (EPROM or Flash memory) (magnetic), an optical fiber (optical), and a portable compact disc read-only memory (CDROM) (optical). Note that the computer-readable medium could even be paper or another suitable medium upon which the program is printed, as the program can be electronically captured, via for instance optical scanning of the paper or other medium, then compiled, interpreted or otherwise processed in a suitable manner if necessary, and then stored in a computer memory.

The principles of the present invention have been disclosed herein as embodied in a portable, hand-held image capture and communication appliance that provides the flexibility of traditional hand-held scanners yet offers an array of intelligent features not heretofore known in the art. Examples of these features include the ability to transfer scanned images both individually and logical groups to other appliances and devices. Furthermore, image transfer can be performed over both serial and IR communication ports. A GUI is provided that includes metaphoric icons and animations that allow even a novice user to successfully operate the appliance with minimal or no outside instruction. It is these intelligent features that place the present invention in a new class of products known as electronic information appliances that merge the functionality of electronic peripheral devices, such as image scanners, with the processing capabilities and graphical interface used in computers.

In concluding the detailed description, it should be noted that it will be obvious to those skilled in the art that many variations and modifications can be made to the preferred embodiment without substantially departing from the principles of the present invention. All such variations and modifications are intended to be included herein within the scope of the present invention, as set forth in the following claims.

We claim:

1. An appliance comprisng:
   a capturing means for acquiring image information and generating at least one page containing the captured information;
   a display means configured to display at least one metaphoric page icon representing at least one page of captured information;
   a send page module for transfer data corresponding to the at least one page of captured information between the appliance and an eternal device;
   a page selection module for selecting at least one of the metamorphic page icons so that data corresponding to selected metamorphic page icons is transferred by the sand page module;
   an icon resembling a status bar, the status bar identifying a total number of pages of captured information selected for transfer by the send page module, and indicating which page of captured information is currently being transferred by the send page module;
   an icon resembling a paper clip, the paper clip icon identifying a group of selected metamorphic page icons; and a menu module executed by a processor, the menu module displaying a plurality of page send options on the display means such that at least one of the page send options is selected.

2. The appliance of claim 1, the page selection module further comprising a send page option such that when selected, the metamorphic page icon currently displayed is selected such that data corresponding to the currently displayed metamorphic page icon is transferred between the appliance and the external device.

3. The appliance of claim 1, the page selection module further comprising a send page option such that when selected, at least one of a pre-selected group of metamorphic page icons is selected such that data corresponding to the pre-selected group of metamorphic page icons is transferred between the appliance and the external device.

4. The appliance of claim 1, the page selection module further comprising a send page option such that when selected, each one of a plurality of preselected metamorphic page icons is selected such that data corresponding to each one of the preselected plurality of metamorphic page icons is transferred between the appliance and the external device.

5. The appliance of claim 1, the page selection module further comprising a send page option such that when selected, at least one pre-tagged metamorphic page icon is selected such that data corresponding to the selected at least one pre-tagged metamorphic page icon is transferred between the appliance and the external device.

6. The appliance of claim 1, the page selection module further comprising a send page option such that when selected, all of the metamorphic page icons are selected such that data corresponding to all of the metamorphic page icons are transferred between the appliance and the external device.

7. The appliance of claim 1, the page selection module further comprising:
a first send page option such that when selected, data corresponding to a current metamorphic page icon is transferred between the appliance and the external device;
a second send page option such that when selected, data corresponding to at least one of a pre-selected group of metamorphic page icons is transferred between the appliance and the external device;
a third send page option such that when selected, data corresponding to each one of a plurality of selected metamorphic page icons is transferred between the appliance and the external device;
a fourth send page option such that when selected, data corresponding to at least one pre-tagged metamorphic page icon is transferred between the appliance and the external device; and
a fifth send page option such that when selected, data corresponding to all metamorphic page icons is transferred between the appliance and the external device.

8. The appliance of claim 7, wherein the first send page option is a default option, such that when one of the plurality of send page options is not selected, the first send page option is selected by default.

9. A method for transferring data between appliances and external devices, the method comprising the steps of:
generating at least one page of captured information corresponding to an image captured by an appliance having a display;
displaying on the display at least one metamorphic page icon resembling the page of captured information, the metamorphic page icon corresponding to the page of captured information;
selecting at least one of the metamorphic page icons;
identifying a selected group of metamorphic page icons with an icon resembling a paper clip attached to the selected metamorphic page icon group;
selecting a send page option on a send page menu;
sending data from tile appliance to an external device according to the selected send page option, the data corresponding to the pages of captured information associated with each of selected metamorphic page icons; and
displaying on the display an icon resembling a status bar, the status bar identifying a total number of pages of captured information selected for transfer by the send page module, and indicating which page of captured information is currently being transferred by the send page module.

10. The method of claim 9, further comprising the step of selecting a send current page option from the send page menu such that the step of sending data sends data associated with the metamorphic page icon currently displayed on the display.

11. The method of claim 10, further comprising the step of specifying the send current page option as a default send page option, such that when one of a plurality of send page options is not selected, the send current page option is selected by default.

12. The method of claim 9, further comprising the steps of:
selecting a group of metamorphic page icons, the group of metamorphic page icons corresponding to a group of pages of captured information; and
selecting a group send page option from the send page menu such that the step of sending data sends data corresponding to the selected group of metamorphic page icons.

13. The method of claim 9, further comprising the steps of:
marking at least one metamorphic page icon; and
selecting a marked send page option from the send page menu such that the step of sending data sends data corresponding to the marked metamorphic page icon.

14. The method of claim 9, further comprising the steps of:
tagging at least one metamorphic page icon; and
selecting a tagged send page option from the send page menu such that the step of sending data sends data corresponding to the tagged metamorphic page icon.

15. The method of claim 9, further comprising the step of selecting a send all page option from the send page menu such that the step of sending data sends data associated with all metamorphic page icons.

16. A computer readable medium having a program for sending information from an appliance to an external device, the program comprising:
logic configured for capturing an image with the appliance;
logic configured for capturing an image;
logic configured for displaying on a display residing on the appliance at least one metamorphic page icon resembling a page of captured information, the metamorphic page icon corresponding to the page of captured information;
logic configured for selecting at least one of the metamorphic page icons;

logic confined for identifying a selected group of metamorphic page icons with an icon resembling a paper clip attached to the selected metamorphic page icon group;

logic configured for selecting a send page option on a send page menu;

logic configured for sending data from the appliance to an external device according to the selected send page option, the data corresponding to the pages of captured information associated with each of selected metamorphic page icons; and logic configured for displaying on the display an icon resembling a status bar, the status bar identifying a total number of pages of captured information selected for transfer by the send page module, and indicating which page of captured information is currently being transferred by the send page module.

17. The program of claim 16, further comprising logic configured for selecting a send current page option from the send page menu such that the appliance sends data associated with the metamorphic page icon currently displayed on the display.

18. The program of claim 16, further comprising:

logic configured for selecting a group of metamorphic page icons, the group of metamorphic page icons corresponding to a group of pages of captured information; and logic configured for selecting a group send page option from the send page menu such that the appliance sends data corresponding to the selected group of metamorphic page icons.

19. The program of claim 16, further comprising:

logic configured for marking at least one metamorphic page icon; and logic configured for selecting a marked send page option from the send page menu such that the appliance sends data corresponding to the marked metamorphic page icon.

20. The program of claim 16, further comprising:

logic configured for tagging at least one metamorphic page icon; and logic configured for selecting a tagged send page option from the send page menu such that the appliance sends data corresponding to the tagged metamorphic page icon.

21. The program of claim 16, further comprising logic configured for selecting a send all page option from the send page menu such that the appliance sends data associated with all metamorphic page icons.

* * * * *

UNITED STATES PATENT AND TRADEMARK OFFICE
CERTIFICATE OF CORRECTION

PATENT NO. : 6,518,982 B2 Page 1 of 1
DATED : February 11, 2003
INVENTOR(S) : James C. Dow et al.

It is certified that error appears in the above-identified patent and that said Letters Patent is hereby corrected as shown below:

Column 16,
Line 8, delete "tile" and insert therefor -- the --

Signed and Sealed this

Twenty-ninth Day of June, 2004

JON W. DUDAS
*Acting Director of the United States Patent and Trademark Office*